Feb. 25, 1936.  E. W. KELLOGG  2,031,835
RECORDING AND REPRODUCTION OF ELECTRICAL IMPULSES
Filed April 4, 1933
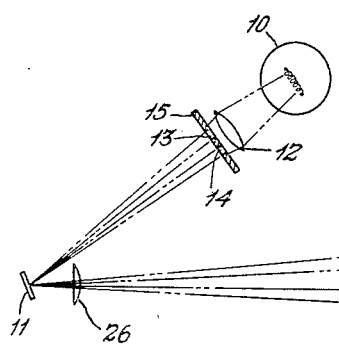
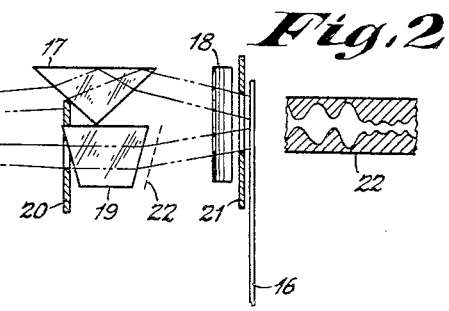
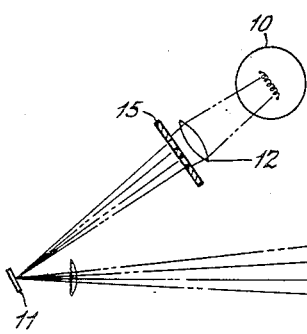
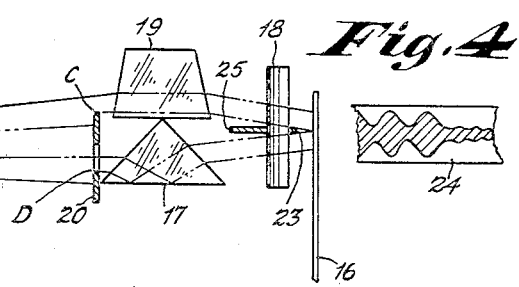
INVENTOR
EDWARD W. KELLOGG
BY
ATTORNEY Patented Feb. 25, 1936

2,031,835

UNITED STATES PATENT OFFICE 2,031,835

RECORDING AND REPRODUCTION OF ELECTRICAL IMPULSES

Edward W. Kellogg, Moorestown, N. J., assignor to Radio Corporation of America, a corporation of Delaware Application April 4, 1933, Serial No. 664,338

5 Claims. (Cl. 179—100.3)

This invention relates to the recording and reproduction of impulses, and has for its principal object the provision of an improved apparatus and method of operation whereby a single element vibrated in accordance with the impulses to be recorded is utilized to modulate a plurality of light beams moved in different directions to product a plurality of records on a photographic record surface. While the invention will be described as utilized in the recording and reproduction of impulses having frequencies within the audio range, it will be apparent that its utility is not confined to this field of operation.

Various types of sound recording and reproducing apparatus have been provided in the past. Such an apparatus is disclosed in a copending application of Glenn L. Dimmick, Serial No. 610,302, filed May 9, 1932. In accordance with this application, light masking means are so arranged that the impulses of opposite polarity are separately recorded on different parts of a photographic record.

The present invention differs from that of the aforesaid application in that a plurality of light beams modulated by the same vibratory element are simultaneously applied to different parts of a photographic surface in a manner to produce similar oppositely disposed records. As will hereinafter appear, this result is produced by means including an optical system which reverses one of the recording beams so as to cause them to vibrate in different directions and is so constructed as to afford beam paths of equal length and equal transparency.

An important object of the invention is the provision of means whereby a plurality of light beams may be caused to vibrate in different directions.

Another object is an improved method of producing variable area records having their serrated edges opposed to one another.

A further object is to provide an improved apparatus which is simple in construction and is operable to record sound with a high degree of fidelity.

A further object is to provide an apparatus which does not require the use of a mechanical light slit in connection with symmetrical records.

The advantages of symmetrical variable width sound track with ground noise reduction obtained by biasing the galvanometer and with the use of a light beam have so far been available only in optical systems including a mechanical light slit. The advantages of this type of track are that the small modulation is kept close to the center of the sound track without the requirement of a shutter or the like and the reduced amplitude of the waves has been found to reduce certain kinds of distortion such as that due to imperfect alinement of the scanning slit, etc.

News reel equipment of the 16 mm. type and possibly some others do not employ a mechanical slit but depend on a line image of the exciter lamp filament produced by a cylindrical lens. This feature results in a great saving in lamp power consumption. For example, optical systems with mechanical slits have required 30 to 75 watt lamps, while a 3 watt lamp is satisfactory for the non-mechanical slit type.

It is not feasible in an optical system of this type to employ a light spot which moves perpendicularly to the line image and to depend on a slanting intersection to vary the length of the illuminated portion because the intersection would be with the cylindrical lens aperture rather than with a narrow slit and the result be a very diffused boundary of the exposed area. It is therefore necessary in systems of this type that the light spot move in a direction parallel to the line image on the recording surface. In accordance with this invention, this result is achieved by means including a multi-apertured light stop or mask for producing a plurality of light beams which are controlled to produce a symmetrical record, that is, a record which consists of two single tracks side by side, oppositely directed and each having an amplitude one-half of that of a single track record.

The invention will be better understood from the following description when considered in connection with the accompanying drawing and its scope will be pointed out in the appended claims.

Referring to the drawing,

Fig. 1 is a diagrammatic illustration of a recording system constructed in accordance with the invention.

Fig. 2 illustrates the type of record produced by the system of Fig. 1.

Fig. 3 illustrates a modified form of system, and

Fig. 4 illustrates the type of record produced by the system of Fig. 3.

The apparatus of Fig. 1 includes a light source 10 from which light is applied to a vibratable mirror 11 through a lens 12 and a pair of rectangularly-shaped apertures 13 and 14 in a light stop or mask 15. The mirror 11 of course forms part of a recording galvanometer or may be vibrated by an acoustically operated diaphragm. From the mirror 11 the two rectangularly-shaped light beams are reflected to a light sensitive record surface 16 respectively through a prism 17 and cylindrical lens 18 and through a prism 19 and the lens 18. Masks 20 and 21 are provided for defining the outer edges of the record track 22 (see Fig. 2) and restricting the two beams to their proper recording surfaces. Due to the fact that the beam A is reflected in the prism 17, movement of the mirror 11 causes the beams A and B to be moved in directions which are opposite and perpendicular to the length dimension of the track.

Due to the fact that the focal length of the lens 26 is such as to produce at the record an image of the rectangular apertures in the light stop 15, there results a sharp and clearly defined boundary to the illuminated area of the record. As the mirror vibrates and the images of the apertures move in a direction parallel to the axis of the cylindrical lens 18, the illuminated fraction of the line changes and a variable area track is produced.

In order to make the optical lengths of the two beams equal and ensure equal focus of the two beams, the prism 19 is interposed in the path of the beam B. This prism acts as a refractor only and is thick enough to ensure about the same length of travel through glass for the two beams. In case it is desirable to compensate for such loss of intensity as occurs in the reflecting prism 17, a screen 22 of slightly darkened glass may be cemented to the surface of the prism for absorbing a small part of the light.

For making a negative track of the type usually utilized an apparatus such as that of Fig. 2 may be used. This apparatus differs from that of Fig. 1 in that the fixed edges of the recording beams are located at the center of the track. In this arrangement, the edges C and D of the mask 20 are not imaged on the recording surface but simply cast shadows. These shadows are not extremely sharp because the galvanometer mirror 11 is of considerable width. In order to properly segregate the two beams, an auxiliary mask 23 is provided, the mask 20 being so located that the light on the record is of full intensity up to the edge of the mask 23. The edge of the mask 23 is close to the record and is so proportioned that the two light beams just meet at the light sensitive surface.

Under these conditions, the center part of the track is always exposed and the outer edges of the beams move toward and away from the center in response to vibrations of the galvanometer mirror 11. The resulting type of negative track is shown by Fig. 4.

If the galvanometer is not biased, the track is illuminated to half its width at zero modulation. For ground noise reduction, the galvanometer is so biased that the moving edges of the beam are very close together when the modulation is low and a very narrow track is produced. It is important that the auxiliary mask 23 and the separating wall 25 be so arranged as to prevent crossing of the beams for the reason that otherwise fogging of the clear areas would be produced during low modulation periods. No harm results if the mask 23 is made a little wider than necessary since the only effect is a narrow line down the center of the track. Such a line, of course, does not interfere with modulation.

It is obvious that the mirror 11 may be actuated either electrically or mechanically, the only requirements being that its movements be in accordance with the phenomena to be recorded. Thus, for example, the mirror 11 may be connected to a diaphragm on which sound waves to be recorded impinge, the connection between the mirror and diaphragm being such as to cause rotation of the mirror when the diaphragm vibrates.

I claim:

1. A photophonographic apparatus including means for modulating a pair of light beams in accordance with the sound to be recorded, a cylindrical lens interposed in the paths of said beams with its length dimension parallel to the movement of said beams, means interposed in one of said paths for reversing the movement of one of said beams, and means for producing a substantially equal sharp focus of each of said beams.

2. A photophonographic apparatus including means for modulating a pair of light beams in accordance with the desired transparency of a symmetrical variable area sound track, a cylindrical lens interposed in the paths of said beams with its length dimension parallel to the movement of said beams, and means interposed in one of said paths for reversing the movement of one of said beams.

3. The combination of means for producing a pair of light beams, means arranged to be moved in accordance with sound impulses for reflecting said beams, a pair of substantially equal optical length paths for said beams, beam reversing means interposed in one of said paths, a cylindrical lens interposed in the paths of said reversed and unreversed beams, and means for segregating said beams from one another.

4. The combination of means for producing a pair of light beams, means arranged to be moved in accordance with electrical impulses for reflecting said beams, a pair of substantially equal optical length paths for said beams, beam reversing means interposed in one of said paths, and a cylindrical lens interposed in the paths of said reversed and unreversed beams.

5. The combination of means for producing a pair of light beams, means arranged to be moved in accordance with sound impulses for reflecting said beams, a pair of substantially equal optical length paths for said beams, beam reversing means interposed in one of said paths, and means for imaging both of said beams in lateral adjacence.

EDWARD W. KELLOGG.